June 19, 1923.  1,459,349

F. VAN ACKEREN

FOWL POWDERER

Filed Nov. 3, 1922

Inventor
F. Van Ackeren
By Philip A. Ferrell
Attorney

Patented June 19, 1923.

1,459,349

UNITED STATES PATENT OFFICE.

FRED VAN ACKEREN, OF CEDAR RAPIDS, NEBRASKA.

FOWL POWDERER.

Application filed November 3, 1922. Serial No. 598,812.

*To all whom it may concern:*

Be it known that FRED VAN ACKEREN, citizen of the United States, residing at Cedar Rapids, in the county of Boone and State of Nebraska, has invented certain new and useful Improvements in Fowl Powderers, of which the following is a specification, reference being had therein to the accompanying drawings.

The invention relates to fowl powderers and has for its object to provide a device of this character comprising an elongated chambered member, through which fowl pass, said member being provided on opposite sides thereof with bellows for the reception of powder, which powder is forced onto the fowl as it passes through the chamber. Also to provide a pivoted platform having link connections with the bellows at each side of the device, which platform is forced downwardly by the weight of the fowl thereon for actuating the bellows. The powdering of the fowl is done for killing vermin on the same or for preventing vermin from getting on the fowl.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 2:
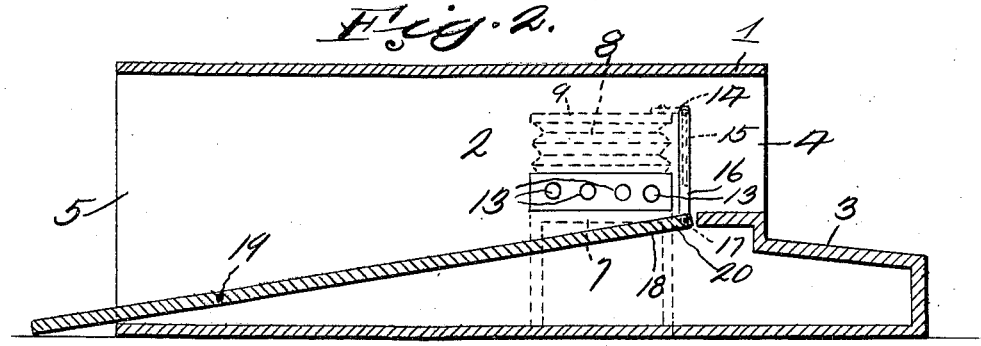
Figure 2 is a vertical longitudinal sectional view through the fowl powderer.
Figure 1:
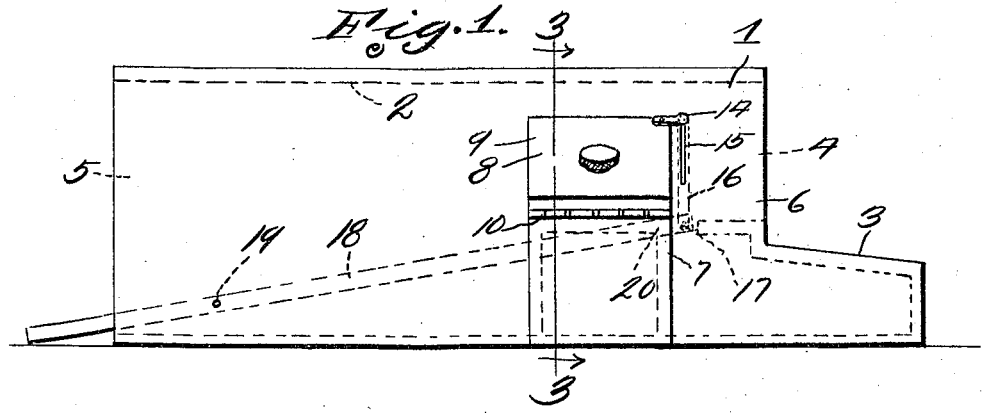
Figure 1 is a side elevation of the fowl duster.
Figure 3:
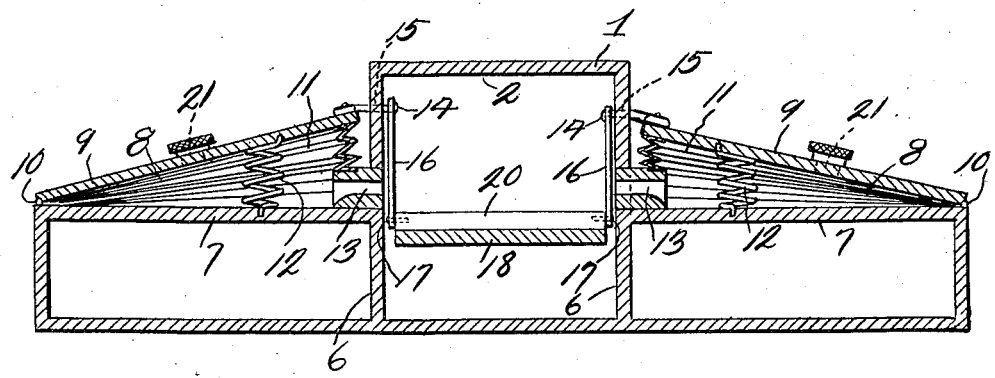
Figure 3 is a vertical transverse sectional view through the device.

Referring to the drawing, the numeral 1 designates an elongated rectangular shaped casing and 2 a chamber extending longitudinally therethrough. One end of the casing 1 is provided with a platform 3 which may be located adjacent a chicken house opening so that fowl may easily enter the device through the entrance 4 and leave the device through the exit 5. Extending outwardly from the opposite walls 6 of the casing are platforms 7, on which platforms are mounted bellows 8, which bellows have their top plates 9 hingedly connected at 10 to the platforms and are provided with the usual collapsible walls 11. Interposed between the platforms 7 and the plates 9 are coiled springs 12, which coiled springs, after each operation of the bellows, return the plates to normal position for the next powdering operation. A vermin powder is placed in the bellows 8 and is projected therefrom into the chamber 2 through the discharge ports 13 onto the sides of the fowl as it passes through the chamber 2. The inner ends of the plates 9 are provided with arms 14, which arms extend through vertically disposed slots 15 in the opposite walls 6 of the casing 1, and have pivotally connected thereto downwardly extending links 16, the lower ends of which are pivotally connected at 17 to the pivoted platform 18. The platform 18 is pivotally mounted at 19 within the chamber 2 of the casing, and it will be seen that when a fowl steps onto the end 20 of the platform 18 that said end will be forced downwardly, thereby causing a downward movement of the link 16 and a compression of the bellows 8, located at opposite sides of the casing. When the bellows are compressed, powder, which has been deposited therein, through the filling openings 21, will be blown against the opposite sides of the fowl even during the downward movement of the platform and consequently the body of the fowl will be thoroughly powdered, thereby killing and preventing vermin on the fowl. When the fowl passes beyond the pivotal point 19, the coil springs 12 within the bellows will expand, thereby extending the bellows for the next powdering operation.

From the above it will be seen that a powdering device is provided for fowl, which device is actuated by the weight of the fowl, is simple in construction and the parts reduced to a minimum.

The invention having been set forth what is claimed as new and useful is:—

1. A fowl powdering device, said device comprising a casing having a chamber extending longitudinally therethrough, a pivoted platform disposed within said chamber and adapted to be depressed by the weight of the fowl thereon at one of its ends, oppositely disposed bellows carried by the casing and located outside thereof and having discharge ports in communication with the chamber at opposite sides thereof and above the platform, and connections between said platform and said bellows whereby they will be actuated by a downward movement of the platform.

2. A fowl powdering device, said device comprising a casing having a chamber extending therethrough, oppositely disposed bellows carried by the opposite sides of the casing and having discharge ports in communication with the chamber, inwardly extending arms carried by said bellows and extending through slots in the opposite walls of the casing, a pivoted platform disposed within the chamber of the casing and having one of its ends disposed adjacent the bellows and below the same, and link connections between the bellows arms and the adjacent end of the platform.

3. A fowl powdering device, said device comprising a casing having a fowl passage therethrough, oppositely disposed bellows carried by the casing and having discharge ports in communication with the fowl passage, a pivoted platform disposed within the casing, and link connection between said platform and bellows and forming means for actuating said bellows upon a downward movement of the platform.

In testimony whereof I hereunto affix my signature.

FRED VAN ACKEREN.